United States Patent
Isobe

(10) Patent No.: US 12,392,384 B2
(45) Date of Patent: Aug. 19, 2025

(54) METHOD FOR PRODUCING A JOINT MEMBER, AND A METHOD FOR PRODUCING AN ANGULAR POSITION HOLDING APPARATUS BY USING A JOINT MEMBER PRODUCED BY THE PRODUCING METHOD

(71) Applicant: Origin Company, Limited, Saitama (JP)

(72) Inventor: Taro Isobe, Saitama (JP)

(73) Assignee: ORIGIN COMPANY, LIMITED, Saitama (JP)

( * ) Notice: Subject to any disclaimer, the term of this patent is extended or adjusted under 35 U.S.C. 154(b) by 0 days.

(21) Appl. No.: 18/038,825

(22) PCT Filed: Mar. 28, 2022

(86) PCT No.: PCT/JP2022/014932
§ 371 (c)(1),
(2) Date: May 25, 2023

(87) PCT Pub. No.: WO2023/007855
PCT Pub. Date: Feb. 2, 2023

(65) Prior Publication Data
US 2024/0019003 A1    Jan. 18, 2024

(30) Foreign Application Priority Data

Jul. 30, 2021 (JP) ................. 2021-125305

(51) Int. Cl.
*F16D 43/21* (2006.01)
*B22F 5/08* (2006.01)
*F16D 41/20* (2006.01)

(52) U.S. Cl.
CPC ........... *F16D 43/21* (2013.01); *B22F 5/08* (2013.01); *F16D 41/206* (2013.01)

(58) Field of Classification Search
CPC .... B22F 5/08; B22F 5/106; B22F 3/03; B22F 7/064; B33Y 10/00; F16D 7/022;
(Continued)

(56) References Cited

U.S. PATENT DOCUMENTS

| 5,468,193 A | 11/1995 | Yamaguchi | |
|---|---|---|---|
| 2003/0146591 A1* | 8/2003 | Ouchi | B21K 25/00 280/93.512 |

(Continued)

FOREIGN PATENT DOCUMENTS

| DE | 10 2019 102 857 | 8/2020 |
|---|---|---|
| DE | 102023136172 A1 * | 7/2024 |

(Continued)

OTHER PUBLICATIONS

Decision to Grant a Patent with search report dated Apr. 3, 2024 in corresponding Taiwanese Patent Application No. 111123130 with English-language translation.

(Continued)

*Primary Examiner* — Lori Wu
(74) *Attorney, Agent, or Firm* — Wenderoth, Lind & Ponack, L.L.P.

(57) ABSTRACT

Provided is a novel producing method for enabling to easily produce a high-quality joint member by powder metallurgy, where the joint member has a male engaging portion and a female engaging portion arranged coaxially at different positions in the axial direction. A male member (14) having a male engaging portion (10) and a female member (16) having a female engaging portion (12) are formed separately by powder metallurgy, and then, the male member (14) and the female member (16) are combined in a relatively non-rotatable manner.

6 Claims, 9 Drawing Sheets

(58) Field of Classification Search
CPC .......... F16D 7/02; F16D 41/206; F16D 41/20; F16D 43/21; F16D 2001/103; F16D 1/02
See application file for complete search history.

(56) References Cited

U.S. PATENT DOCUMENTS

| | | |
|---|---|---|
| 2012/0132160 A1 | 5/2012 | Malen et al. |
| 2012/0279336 A1* | 11/2012 | Dommsch ............. E05F 15/697 74/411.5 |
| 2014/0270921 A1 | 9/2014 | Ramadoss et al. |
| 2015/0167815 A1 | 6/2015 | Sin |
| 2017/0203367 A1 | 7/2017 | Sin |
| 2022/0127894 A1 | 4/2022 | Henzler et al. |
| 2022/0373039 A1 | 11/2022 | Isobe |
| 2023/0175560 A1 | 6/2023 | Isobe et al. |

FOREIGN PATENT DOCUMENTS

| | | |
|---|---|---|
| JP | 2003-130077 | 5/2003 |
| JP | 2010-164113 | 7/2010 |
| JP | 2012-526189 | 10/2012 |
| JP | 2016-160972 | 9/2016 |
| JP | 2020-173000 | 10/2020 |
| JP | 6815567 | 1/2021 |
| JP | 7035254 | 3/2022 |

OTHER PUBLICATIONS

Extended European Search Report issued Mar. 26, 2024 in corresponding European Patent Application No. 22848938.1.
International Search Report issued Jun. 7, 2022 in corresponding International Application No. PCT/JP2022/014932.

* cited by examiner

METHOD FOR PRODUCING A JOINT MEMBER, AND A METHOD FOR PRODUCING AN ANGULAR POSITION HOLDING APPARATUS BY USING A JOINT MEMBER PRODUCED BY THE PRODUCING METHOD

TECHNICAL FIELD

The present invention relates to a method for producing a joint member, particularly, a joint member comprising a male engaging portion and a female engaging portion arranged coaxially at different positions in the axial direction, and a method for producing an angular position holding apparatus using a joint member produced by the producing method.

BACKGROUND ART

Patent document 1 below discloses an angular position holding apparatus mounted on a shaft that transmits rotation torque from an input-side device such as an electromotive motor to an output-side device such as a hatchback of vehicle. The angular position holding apparatus holds the angular position of the output-side device even when the drive of the input-side device is stopped. In the angular position holding apparatus, when rotation torque is inputted from the input-side device, the shaft rotates against the required braking torque of a braking torque applying means. When no rotation torque is inputted from the input-side device, the shaft is held by the required braking torque.

PRIOR ART DOCUMENT

Patent Document

Patent Document 1: JP6815567

SUMMARY OF THE INVENTION

Problem to be Solved by the Invention

In the angular position holding apparatus disclosed in Patent document 1, a shaft extending from the input-side device is directly connected to the output-side device. In another constitutional examples of the input-side device and the output-side device, a shaft for transmitting rotation to both the input-side device and the output-side device is provided. In this example, it may be required to connect the shafts by the angular position holding apparatus. In other words, the angular position holding apparatus may be required to function as a joint to indirectly connect the shaft extending from the input-side device and the shaft extending from the output-side device. Here, in a case where the shaft extending from the input-side device and the shaft extending from the output-side device are both provided with female engagement portions, the shafts can be connected by preparing a joint member comprising male engaging portions to be engaged with both of the female engagement portions. In a case where the shafts are provided with male engagement portions, the shafts can be connected by preparing a joint member comprising female engaging portions to be engaged with both the male engagement portions. Further in a case where either the shaft extending from the input-side device or the shaft extending from the output-side device comprises the female engagement portion and the other shaft comprises the male engagement portion, the prepared joint member may be required to have the male engaging portion and the female engaging portion that are coaxially arranged, respectively.

The braking torque applying means provided to the angular position holding apparatus disclosed in Patent document 1 is a coil spring, and it is mounted on the outer peripheral surface of an inner ring through which the shafts penetrate. The inner ring rotates against the braking torque caused by the clamping force of the coil spring, that is, the inner ring slides relative to the coil spring. Therefore, the inner ring is required to have a considerable strength including wear resistance, and it is produced by powder metallurgy.

In a case where the joint member, i.e., the joint member having the male engaging portion and the female engaging portion that are arranged coaxially, is used as the inner ring of the angular position holding apparatus disclosed in Patent document 1, there is a necessity that the joint member is provided with a cylindrical portion on which the coil spring is to be mounted. For this reason, it is impossible to arrange the male engaging portion and the female engaging portion coaxially at the same position in the axial direction, but the engaging portions are required to be arranged coaxially at different positions. As described later in detail with reference to the attached drawings, such a joint member (inner ring) is integrally produced by powder metallurgy using a molding die composed of a female mold having a bottomed recess portion extending in the axial direction and a male mold capable of entering the female mold. The male mold is provided with a protrusion protruding in the axial direction to define the female engaging portion. In production of a joint member by using the molding die, the interior of the female mold is filled with a powder, and then, the male mold is made enter the female mold so as to compress the powder, whereby a compact is formed. Later, the compact is taken out from the molding die and sintered.

The joint member is formed as mentioned above by use of a molding die, more specifically, by making the male mold enter the female mold so as to compress the powder. In the formation, problems as described below may occur, because the protrusion protruding in the axial direction is formed on the pressing surface (lower surface) of the male mold, and the protrusion has an outer peripheral surface for defining the female engaging portion. The problems are: (1) since the protrusion tends to buckle because the axial load due to the compression is concentrated to the free end surface of the protrusion, the male mold is required to have a considerable strength; (2) a part of the powder present in front of the protrusion is forced radially outward rather than axially, and this causes unfavorable fluidity of the powder, so that excessive resistance is generated when making the male mold enter the female mold, i.e. excessive force is required to make the male mold enter the female mold; (3) since only the powder present in front of the protrusion is compressed to a relatively high density, the density distribution of the powder constituting the compact becomes uneven, and cracks may occur in the sintering.

The aforementioned joint member, i.e., a joint member having a male engaging portion and the female engaging portion arranged coaxially at different positions in the axial direction, may be produced to have a high strength in an alternative method of scraping from a metal block. However, this method is unpractical because it is considerably disadvantageous from the viewpoint of production efficiency and cost.

The present invention has been completed in view of these problems. The main technical object is to provide a novel producing method for facilitating production of a high-quality joint member having a male engaging portion and a female engaging portion arranged coaxially at different positions in the axial direction, by employing powder metallurgy for the production.

Means for Solving the Problems

As a result of intense studies, the present inventor has found that the aforementioned main technical object can be achieved by forming a male member comprising a male engaging portion and a female member comprising a female engaging portion separately by powder metallurgy, and then, by combining the male member and the female member in a relatively non-rotatable manner.

That is, the present invention provides, as a method of producing a joint member to achieve the aforementioned main technical objects, a method for producing a joint member having a male engaging portion and a female engaging portion arranged coaxially at different positions in the axial direction. The method is characterized in that a male member comprising the male engaging portion with a locking portion and a female member comprising the female engaging portion with a lock portion are formed separately by powder metallurgy, and then, the locking portion and the lock portion are locked to combine the male member and the female member in a relatively non-rotatable manner.

Preferably, both the male engaging portion and the female engaging portion are shaped like a gear. In this case, preferably the pitch diameter of the male engaging portion is equal to or less than the pitch diameter of the female engaging portion. Further, the male engaging portion is preferred to be a male serration, and the female engaging portion is preferred to be a female serration. It is preferable that the male member is provided with a flange portion to which one end of the male engaging portion is fixed, and the female member is provided with a recess portion to accept the flange portion, where the locking portion is a protrusion protruding radially outward on the outer peripheral surface of the flange portion, and the lock portion is a depression with which the protrusion is to fit on the inner peripheral surface of the recess portion. An angular position holding apparatus produced in this method comprises a joint member to mutually connect an input-side device and an output-side device and a braking torque applying means to apply required braking torque to the joint member, in which the joint member rotates against the required braking torque when rotation torque is inputted from the input-side device, and the joint member is held by the required braking torque when no rotation torque is inputted from the input-side device. The joint member can be produced by the aforementioned producing method. In this case, it is preferable that at least the female member of the joint member is arranged inside the fixed housing, and the joint member is supported from both axial sides by an end plate provided in the housing and a shield mounted on the housing. It is also preferable that the braking torque applying means is a coil spring composed of a wound portion formed of a helically wound wire and hook portions formed of the wire extending radially outward from the wound portion. The wound portion in a free state has an inner diameter smaller than the outer diameter of the female member of the joint member. The coil spring with the wound portion in a state in which the diameter thereof is enlarged is mounted on the outer peripheral surface of the female member, and the hook portions are to fit with the hook groove formed on the inner peripheral surface of the housing. The coil spring is non-rotatable relative to the housing. When the joint member rotates, the hook portions are pushed in the hook groove in the direction for loosing the coil spring.

Effect of the Invention

According to the present invention, the joint member is produced by forming a male member comprising a male engaging portion and a female member comprising a female engaging portion separately by powder metallurgy, and then, by combining the male member and the female in a relatively non-rotatable manner. As a result, the female member can be formed while any protrusion protruding in the axial direction is not provided on the pressing surface of the male mold. Thereby, a high-quality joint member having a male engaging portion and a female engaging portion arranged coaxially at different positions in the axial direction can be produced easily by powder metallurgy, without facing the aforementioned problems that may occur in a case of integrally producing by powder metallurgy the joint member having the male engaging portion and the female engaging portion arranged coaxially at the different positions.

MODE FOR CARRYING OUT THE INVENTION

Hereinafter, preferred embodiments of the method for producing a joint member constituted according to the present invention and also an angular position holding apparatus comprising the joint member produced by the producing method are described in further detail with reference to the attached drawings. In this context, "axial first side" indicates the left side in the A-A cross section of FIG. 1, and "axial second side" indicates the right side in the same view unless otherwise specified.

Figure 1:
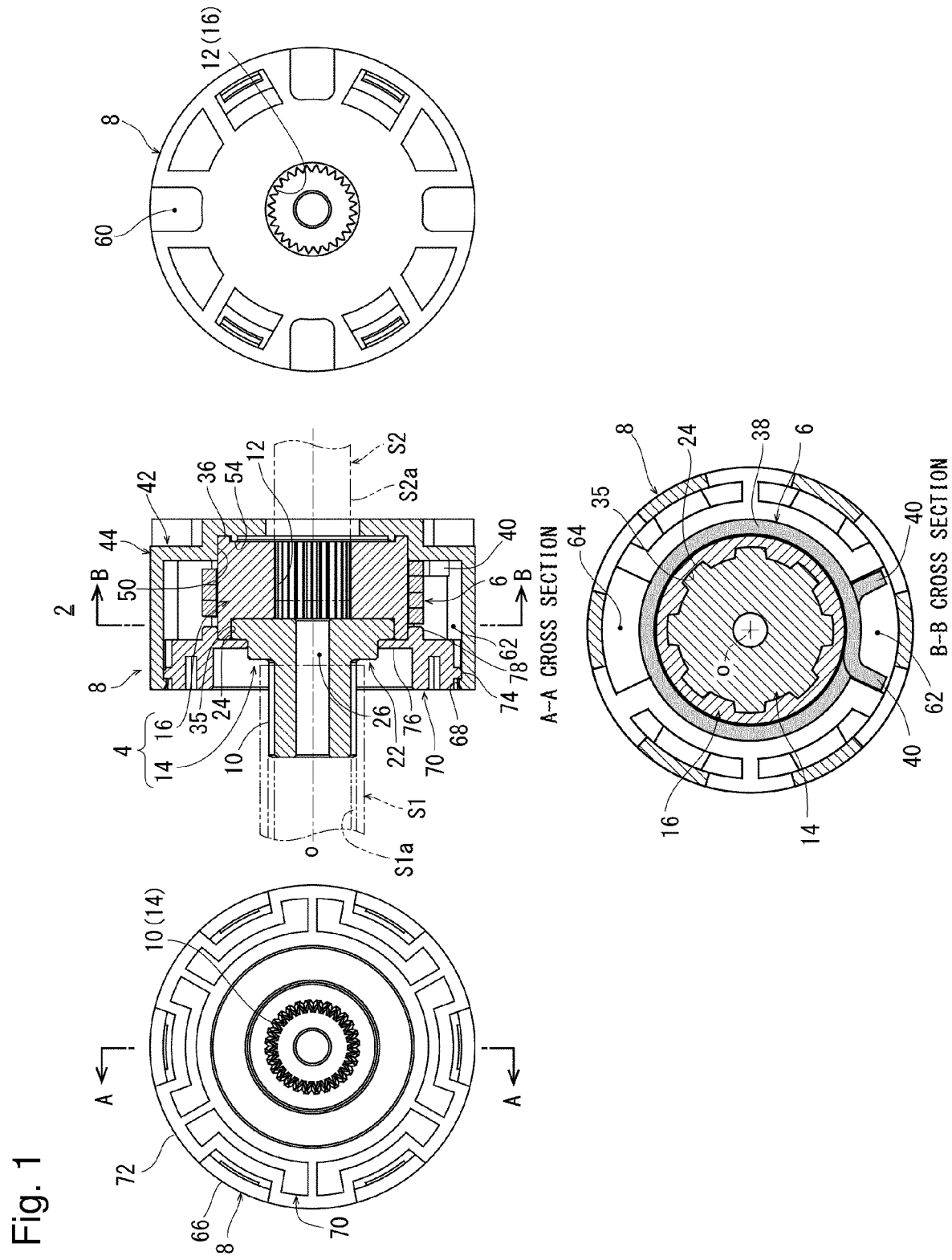
FIG. 1 includes diagrams showing the overall configuration of a preferred embodiment of an angular position holding apparatus comprising a joint member produced by the producing method of the present invention.
Figure 2:
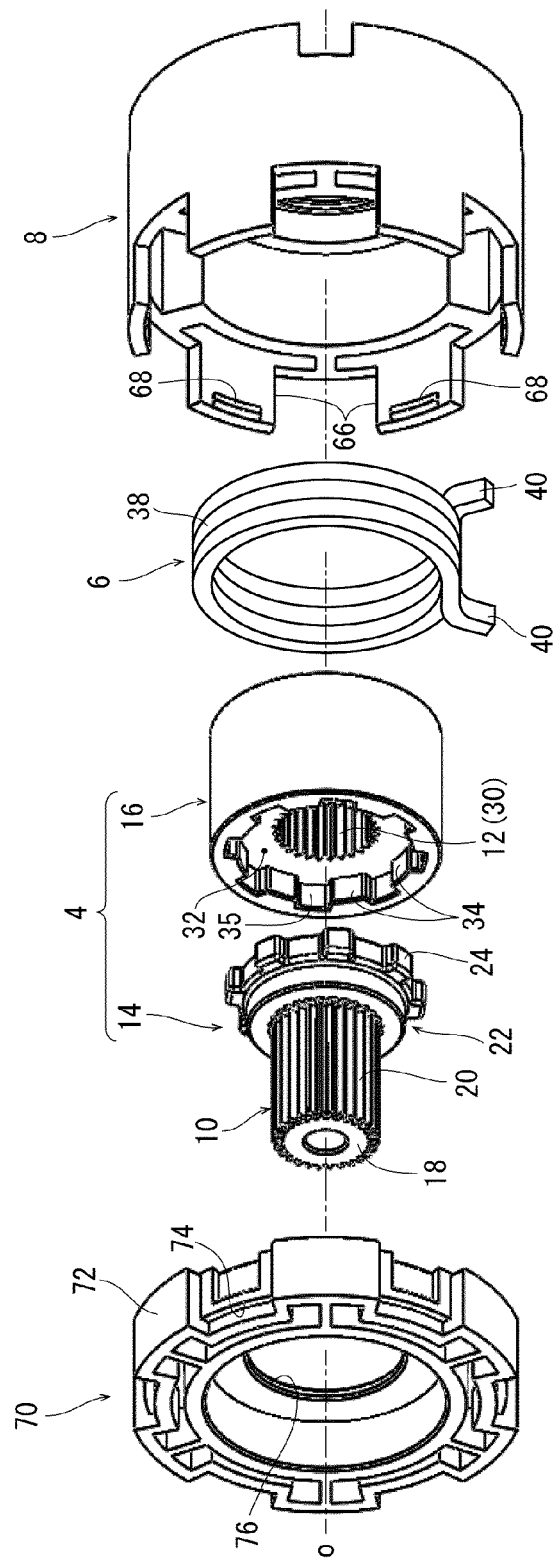
FIG. 2 is a perspective exploded view showing the respective components of the angular position holding apparatus shown in FIG. 1.

The following explanation is made referring to FIGS. 1 and 2. An angular position holding apparatus denoted with numeral 2 comprises a joint member 4, a braking torque applying means 6 for applying required braking torque to the joint member 4, and a fixed housing 8. In the B-B cross-section of FIG. 1, the braking torque applying means 6 (this is a coil spring in the illustrated embodiment, as will be described later) is shadowed for clarification.

The joint member 4 is a member that connects a shaft S1 extending from the input-side device and a shaft S2 extending from the output-side device so as to transmit rotation of the shaft S1 to the shaft S2. The rotational axis of the joint member 4 is indicated as 'o'. The shaft S1 comprises a female engagement portion Sla, and the shaft S2 comprises a male engagement portion S2a. The joint member 4 comprises a male engaging portion 10 to be engaged with the female engagement portion Sla, and also a female engaging portion 12 to be engaged with the male engagement portion S2a. As will be described later, since the male engaging portion 10 is a male serration and the female engaging portion 12 is female serration in the illustrated embodiment, the female engagement portion Sla is a female serration and the male engagement portion S2a is a male serration. Since the joint member 4 rotates while slipping (i.e., slides) relative to the braking torque applying means (coil spring) 6 as described below, the joint member 4 is required to have a considerable strength including abrasion resistance, and thus, the joint member 4 is produced by powder metallurgy. In the present invention, it is important that the joint member 4 is produced by forming separately a male member 14 comprising the male engaging portion 10 and a female member 16 comprising the female engaging portion 12 by powder metallurgy, and then, combining the male member 14 and the female member 16 in a relatively non-rotatable manner.

Figure 3:
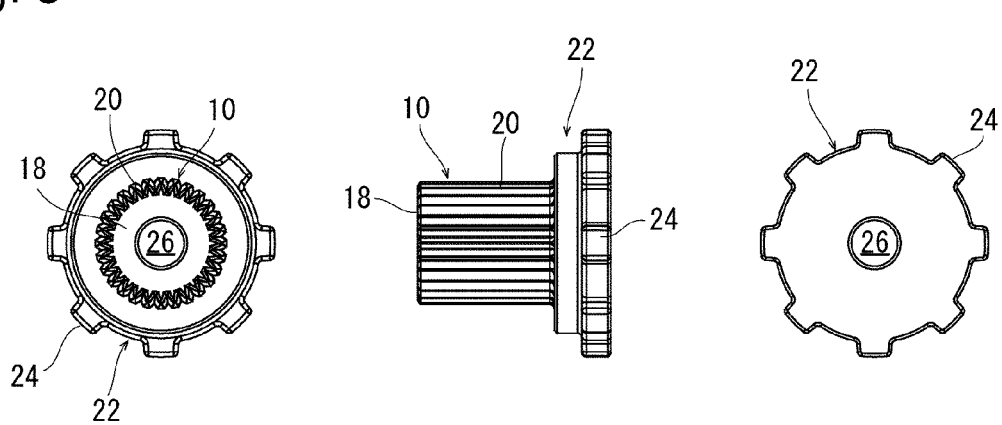
FIG. 3 includes diagrams showing a male member constituting the joint member of the angular position holding apparatus shown in FIG. 1.

The following explanation is made referring to FIG. 3, together with FIGS. 1 and 2. The male engaging portion 10 of the male member 14 is a male serration in the illustrated embodiment, and it is composed of a number of external teeth 20 linearly extending in the axial direction on the outer peripheral surface of a cylindrical shaft portion 18 extending in the axial direction. One end of the male engaging portion 10, namely, the end in the axial second side is fixed to the flange portion 22. A plurality of locking portions 24 (eight in the illustrated embodiment) each composed of a protrusion protruding radially outward are formed on the outer peripheral surface of the flange portion 22, more particularly, at the axial second side portion. The locking portions 24 are formed at equal angular intervals in the circumferential direction. In the illustrated embodiment, the locking portions 24 constitute a male square spline. The central axes of the male engaging portion 10 and the flange portion 22 are identical to the rotational axis o. The male member 14 is formed with a through hole 26 extending linearly in the axial direction along the rotational axis o.

Figure 4:
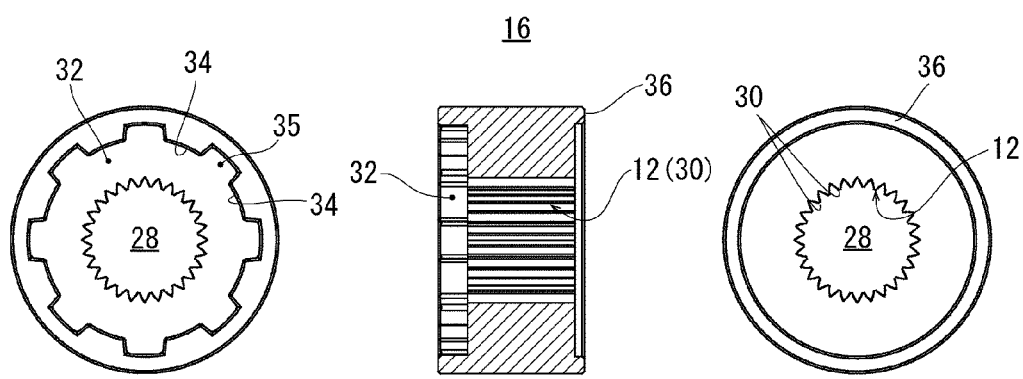
FIG. 4 includes diagrams showing a female member constituting the joint member of the angular position holding apparatus shown in FIG. 1.

The following explanation is made referring to FIG. 4, together with FIGS. 1 and 2. The female member 16 has a cylindrical shape and has a through hole 28 extending linearly in the axial direction along the rotational axis o. In the illustrated embodiment, the female engaging portion 12 is a female serration, and it is constituted with a number of internal teeth 30 extending linearly in the axial direction on the inner peripheral surface of the female member 16. The pitch diameter of the male serration of the male engaging portion 10 and that of the female serration of the female engaging portion 12 are the same. The pitch diameter of the male engaging portion 10 is preferably equal to or less than the pitch diameter of the female engaging portion 12. Recess portions 32 are formed by partly increasing the inner diameter at the axial first side end portion of the female member 16. On the inner peripheral surfaces of the recess portions 32, a plurality of protrusions 34 protruding radially inward are formed. The protrusions 34 (therefore, eight in the illustrated embodiment) are formed at equal angular intervals in the circumferential direction so as to correspond to the locking portion 24 provided on the male member 14, and between each pair of the protrusions 34 adjacent to each other, a lock portion 35 depressed radially outward is defined. In the illustrated embodiment, the lock portions 35 constitute a female square spline. The recess portions 32 of the female member 16 accept the flange portion 22 of the male member 14, and the locking portions 24 of the male member 14 fit with the lock portions 35 of the female member 16, so that the male member 14 and the female member 16 are locked in a relatively non-rotatable manner. A cylindrical supported wall 36 continuously extending in the circumferential direction along the outer peripheral edge is formed on the axial second side end surface of the female member 16. The supported wall 36 is supported by the supportive wall 54 of the housing 8 and a connection portion 50 of the end plate 42, as described below.

As shown in FIGS. 1 and 2, in the illustrated embodiment, the braking torque applying means 6 is a coil spring formed of a metal wire (hereinafter, the coil spring is denoted with the numeral 6). The coil spring 6 comprises a wound portion 38 formed of a helically wound wire and hook portions 40 extending radially outward from the wound portion 38. The hook portions 40 are formed at both axial ends of the wound portion 38. When the coil spring 6 is in a free state, i.e. when the coil spring 6 is in a state of not applied with any external force, the inner diameter of the wound portion 38 is smaller than the outer diameter of the female member 16 of the joint member 4, and the coil spring 6 with the wound portion 38 in a state in which the diameter thereof is enlarged is mounted on the outer peripheral surface of the female member 16. The two hook portions 40 are fitted with a hook groove 62, which is described below, formed together on the housing 8, so that the coil spring 6 becomes non-rotatable relative to the housing 8.

Figure 5:
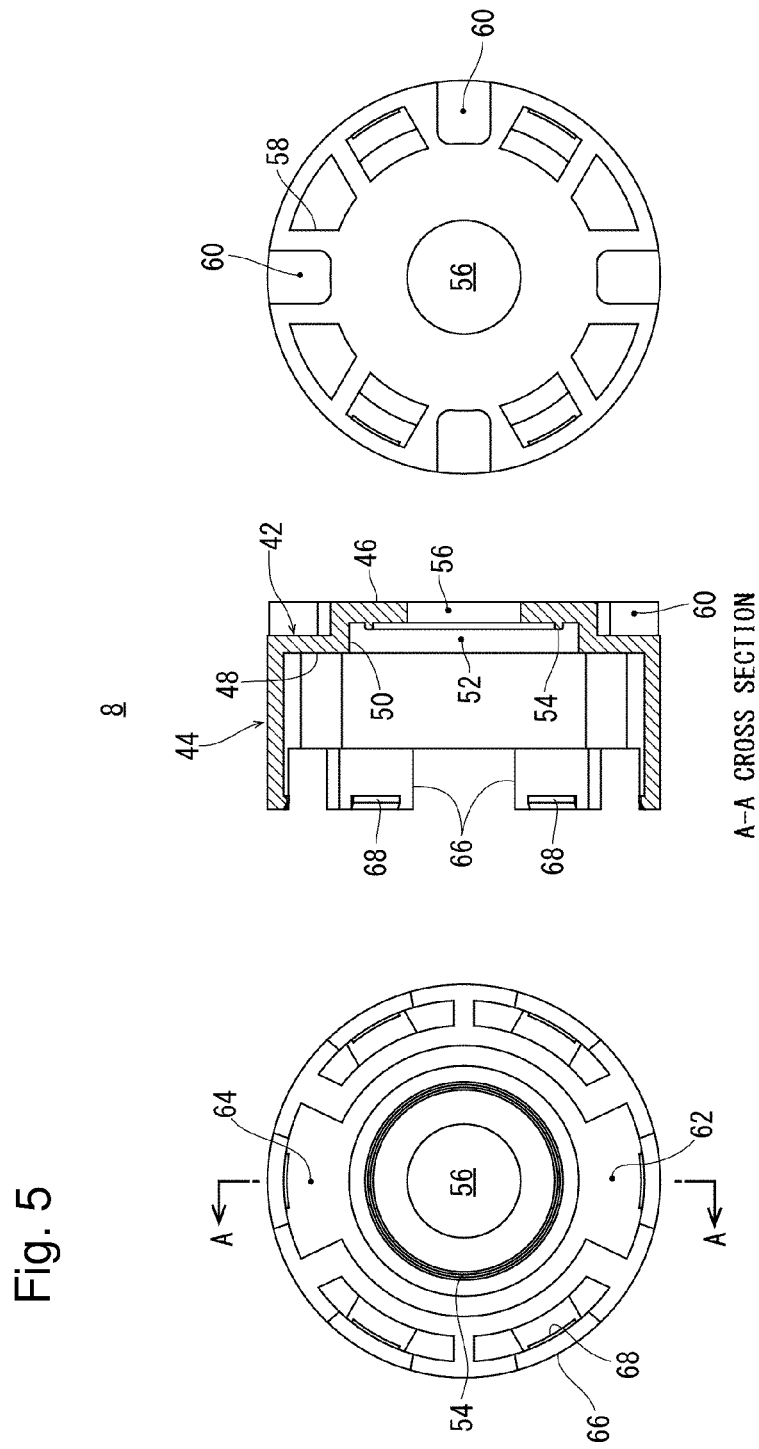
FIG. 5 includes diagrams showing a housing of the angular position holding apparatus shown in FIG. 1.

The following explanation is made referring to FIG. 5, together with FIGS. 1 and 2. The housing 8 formed from an appropriate synthetic resin is shaped as a cup comprising an end plate 42 arranged perpendicular to the rotational axis o and a cylindrical outer peripheral wall 44 extending toward the axial first side from the outer peripheral edge of the end plate 42. The female member 16 of the joint member 4 is housed inside. Though the end plate 42 is circular when viewed in the axial direction, its circular central portion 46 is slightly displaced to the axial second side relative to the annular outer peripheral portion 48. Between the outer peripheral edge of the central portion 46 and the inner peripheral edge of the outer peripheral portion 48, a cylindrical connection portion 50 is provided. The central portion 46 and the connection portion 50 constitute a circular bearing recess portion 52 to bear the axial second side end portion of the female member 16 of the joint member 4. At the outer peripheral edge portion of the axial first side surface of the central portion 46 of the end plate 42, a cylindrical supportive wall 54 continuously extending in the circumferential direction is formed. A supported wall 36 formed on the female member 16 enters between the supportive wall 54 and the connection portion 50 of the end plate 42, so that the joint member 4 can stably rotate relative to the housing 8. A circular through hole 56 penetrating in the axial direction is formed at the center of the end plate 42. The male engagement portion S2a of the shaft S2 passes through the through hole 56 so as to be engaged with the female engaging portion 12 formed in the female member 16 of the joint member 4. On the outer peripheral portion 48 of the axial second side surface of the end plate 42, ribs 58 of a predetermined shape are arranged to stand up toward the axial second side, whereby four fixed recess portions 60 open toward the axial second side and radially outward are formed on the end plate 42. The fixed recess portions 60 are formed at equal angular intervals in the circumferential direction, and they are used at the time of fixing the housing 8 to a vehicle or the like.

On the inner peripheral surface of the outer peripheral wall 44, an arc-shape hook groove 62 is formed by increasing the inner diameter over a predetermined angular range. The hook groove 62 extends linearly in the axial direction. As shown in B-B cross-section of FIG. 1, both of the two hook portions 40 of the coil spring 6 are fitted with the hook groove 62. In the illustrated embodiment, a dummy groove 64 having the same shape as the hook groove 62 is formed on the side radially opposite to the hook groove 62 on the inner peripheral surface of the outer peripheral wall 44. The dummy groove 64 is formed in consideration of assemblability, so that the dummy groove 64 can be used as the hook groove 62. On the free end surface, i.e., on the axial first side end surface of the outer peripheral wall 44, six arc-shape circumferential locking pieces 66, each further extending toward the axial first side, are provided at circumferentially equal angular intervals. On the extending end portion on the inner side surface of each circumferential locking piece 66, an axial locking protrusion 68 protruding radially inward is formed.

Figure 6:
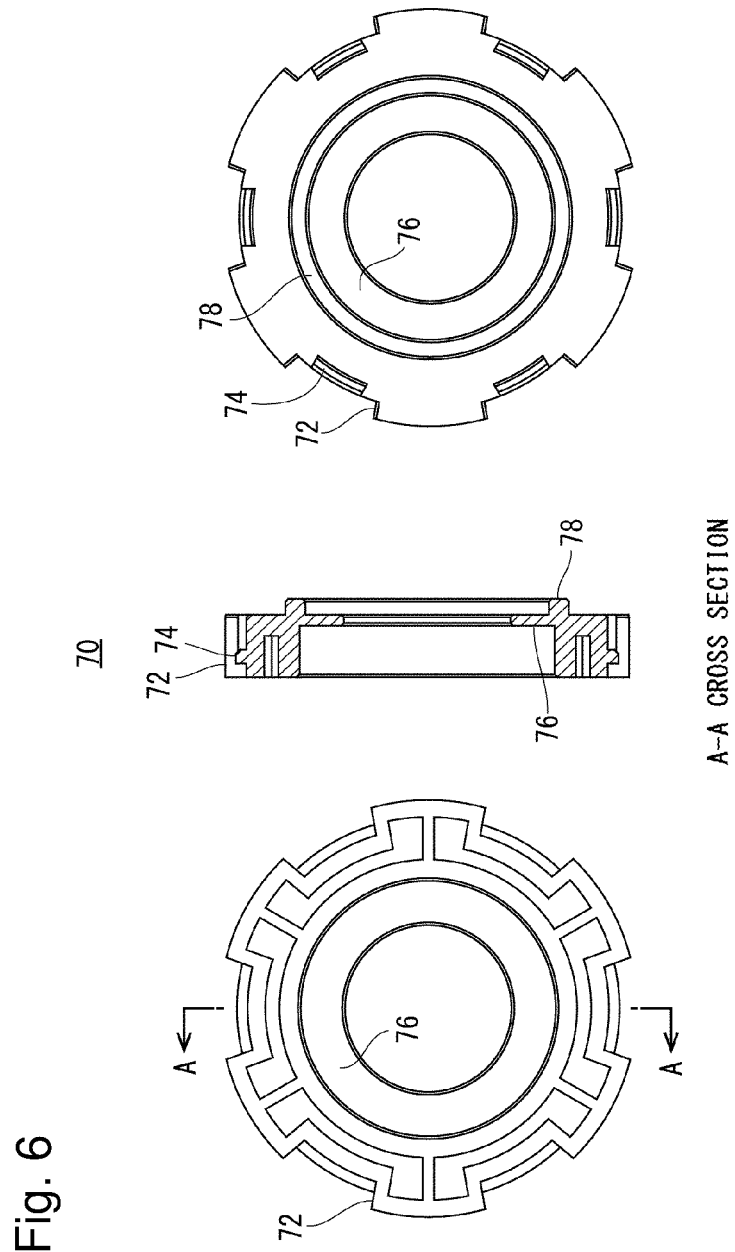
FIG. 6 includes diagrams showing a shield of the angular position holding apparatus shown in FIG. 1.

The open end of the housing 8, that is, the axial first side end of the outer peripheral wall 44 is closed by a shield 70. The following explanation will be made by referring to FIG. 6 together with FIGS. 1 and 2. The shield 70 made of a synthetic resin has an annular shape as a whole. On the outer peripheral surface of the shield 70, arc-shaped circumferentially lock pieces 72 extending radially outward are provided. On the outer peripheral surface of the shield 70, axially lock protrusions 74 protruding radially outward are provided further. The circumferentially lock pieces 72 and the circumferentially locking pieces 66 are locked in the circumferential direction while axially lock protrusions 74 and the axially locking protrusions 68 are locked in the axial direction, whereby the shield 70 is fixed to the housing 8. At the axial second side end of the inner peripheral surface of the shield 70, an annular supportive piece 76 extending radially inward and also extending continuously in the circumferential direction is formed. The supportive piece 76 supports the male member 14 and the female member 16 of the joint member 4 simultaneously from the axial first side. As it can be understood by referring to A-A cross-section of FIG. 1, the axial second side surface of the supportive piece 76 is opposed to the axial first side surfaces of the locking portions 24 provided on the male member 14, and also opposed to the axial first side surfaces of the protrusions 34 of the female member 16. On the inner peripheral edge portion of the axial second side surface of the shield 70, a cylindrical supportive wall 78 protruding toward the axial second side and extending continuously in the circumferential direction is formed. The supportive wall 78 rotatably bears the axial first side end portion of the female member 16 of the joint member 4 disposed inside thereof, and also limits axial movement of the coil spring 6.

The angular position holding apparatus 2 operates as follows. Specifically, the shaft S1 extending from the input-side device, the joint member 4 and the shaft S2 extending from the output-side device are formed integrally. Therefore, when the rotation torque is inputted from the input-side device, the joint member 4 begins to rotate together with the coil spring 6. However, as mentioned above, since the coil spring 6 is not rotatable relative to the housing 8, in the hook groove 62 formed in the housing 8, one of the two hook portions 40 is pushed in the direction relatively to loosen the coil spring 6 by the inner side surface of the housing 8 for defining the hook groove 62, whereby the joint member 4 rotates relative to the coil spring 6 (and to the housing 8) against the braking torque caused by the clamping force of the coil spring 6. That is, the rotation torque from the input-side device is transmitted to the output-side device, thereby driving the same. When the rotation torque from the input-side device is not inputted, the joint member 4 is held by the required braking torque from the coil spring 6, whereby the angular position of the output-side device is also held.

As described above, it is important in the method of producing the joint member 4 of the present invention that the male member 14 comprising the male engaging portion 10 and the female member 16 comprising the female engaging portion 12 are formed separately by powder metallurgy, and then, the male member 14 and the female member 16 are combined in a relatively non-rotatable manner. It may be also possible to integrally forming a joint member 4' (denoted with a chain double-dashed line in FIG. 7) comprising a male engaging portion 10' and a female engaging portion 12' arranged coaxially at different positions in the axial direction by powder metallurgy, but this method is not favorable due to the reasons described below. In the following description, parts belonging to the joint member 4' and corresponding to the parts of above-described joint member 4 are given the same reference numerals attached with "'". In the case of forming the joint member 4' by powder metallurgy, it is necessary to set the axial direction of the joint member 4' to the vertical direction. For the reasons, in the following description, the axial first side will be regarded as the lower region and the axial second side will be regarded as the upper region.

Figure 7:
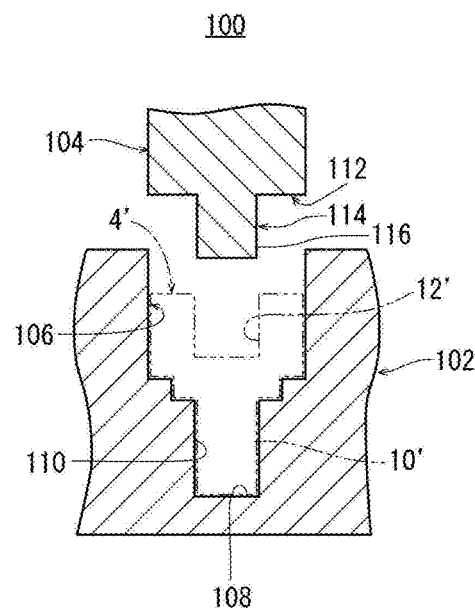
FIG. 7 is a diagram showing a molding die for integrally molding the joint member of the angular position holding apparatus shown in FIG. 1.

FIG. 7 shows a molding die 100 for forming the joint member 4' by powder metallurgy. The molding die 100 comprises a fixed female mold 102 and a male mold 104 movable in the vertical direction relative to the female mold 102. The female mold 102 comprises a bottomed recess portion extending in the vertical direction, and the bottomed recess portion has an inner peripheral surface 106 for defining the outer peripheral surface of the joint member 4', and an inner bottom surface 108 for defining the axial first side end surface (lower end surface) of the joint member 4'. An inner peripheral surface lower portion 110 extends upward from the outer peripheral edge of the inner bottom surface 108 of the inner peripheral surface 106, so that it defines a male engaging portion 10' of the joint member 4'. The male mold 104 is capable of entering the bottomed recess portion of the female mold 102, and it has a lower surface 112 for defining the axial second side end surface (upper end surface) of the joint member 4'. At the center of the lower surface 112, a protrusion 114 protruding downward to the inner bottom surface 108 of the female mold 102 is formed, and an outer peripheral surface 116 of the projection 114 defines a female engaging portion 12' of the joint member 4'.

Figure 8A:
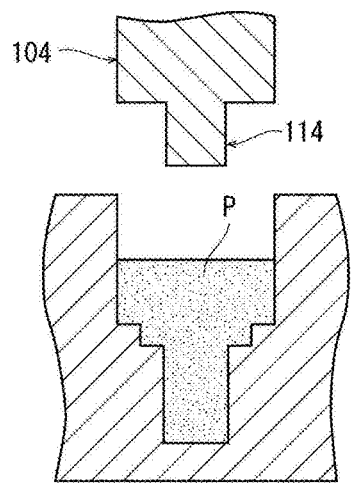
FIGS. 8(a) and 8(b) include diagrams for explaining problems at the time of formation using the molding die shown in FIG. 7.
Figure 8B:
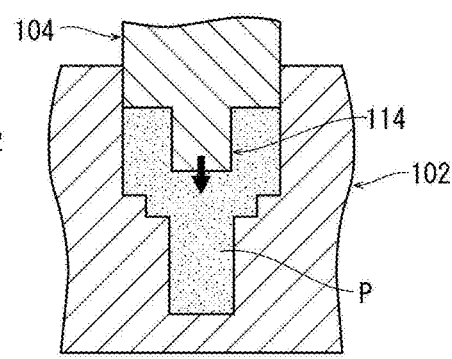

The following explanation is made with reference to FIGS. 8(a) and 8(b). In producing the joint member 4', first, the female mold 102 is filled with a metal powder P as shown in FIG. 8(a). Then, as shown in FIG. 8(b), the male mold 104 is lowered to enter the female mold 102, thereby compressing a powder P to form a compact as indicated with an arrow in the figure. Later, the molding die 100 is opened (i.e., the male mold 104 is lifted to be distanced from the female mold 102), from which the compact is taken out and sintered.

As for the joint member 4' to be formed by use of the molding die 100, a protrusion 114 protruding in the axial direction is provided on a lower surface 112 (pressing surface) of the male mold 104. Since the outer peripheral surface of the protrusion 114 defines the female engaging portion 12', problems mentioned below may be caused at the time of making the male mold 104 enter the female mold 102 so as to compress the powder. That is, (1) since vertical load due to the compression is concentrated to the free end surface of the protrusion 114, the protrusion 114 will easily buckle, and thus, the male mold 104 comprising the protrusion 114 is required to have a considerable strength; (2) since a part of the powder present in front of the protrusion 114 (the lower region in the illustrated embodiment) is forced laterally rather than downward, the flowability of the powder is not favorable, and excessive resistance may be generated at the time of making the male mold 104 enter the female mold 102, which means that excessive power is required for making the male mold 104 enter the female mold 102; and (3) since only the powder present in front of the protrusion 114 is compressed to a relatively high density, the density distribution of the powder constituting the compact becomes uneven, and thus, cracks may occur at the time of sintering.

In contrast, in the producing method of the present invention, the male member 14 comprising the male engaging portion 10 and the female member 16 comprising the female engaging portion 12 are produced separately by powder metallurgy. According to this method, the female member can be formed without providing a protrusion protruding in the axial direction on the lower surface (pressing surface) of the male mold, and thus, the aforementioned problems may not be caused. Hereinafter, an example of process for producing the male member 14 and the female member 16 will be described with reference to FIGS. 9 and 10.

Figure 9:
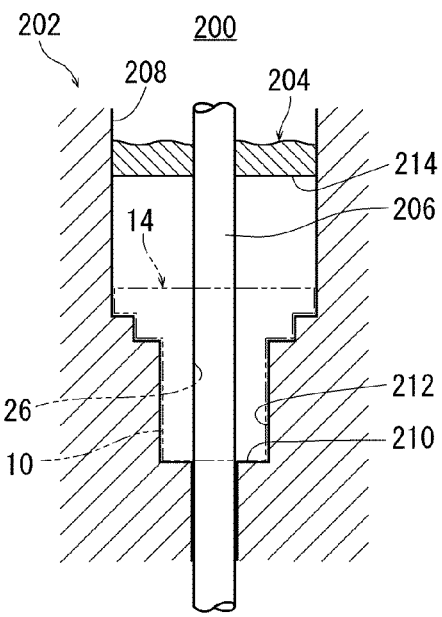
FIG. 9 is a diagram showing an example of a molding die for forming the male member shown in FIG. 3.

FIG. 9 shows an example of a molding die 200 for molding the male member 14 indicated with a chain double-dashed line in the figure. The molding die 200 comprises a fixed female mold 202, a male mold 204 that is vertically movable relative to the female mold 202, and a core cylinder 206 extending linearly in the vertical direction inside the female mold 202. The female mold 202 comprises a bottomed recess portion extending in the vertical direction. The bottomed recess portion has an inner peripheral surface 208 for defining the outer peripheral surface of the male member 14 and an inner bottom surface 210 for defining the axial first side end surface (lower end surface) of the male member 14. An inner peripheral surface lower portion 212 extending upward from the outer peripheral edge of the inner bottom surface 210 of the inner peripheral surface 208 defines the male engaging portion 10 of the male member 14. The male mold 204 is capable of entering the bottomed recess portion of the female mold 202, and it has a flat lower surface 214 for defining the axial second side end surface (upper end surface) of the male member 14. A hole through which the core cylinder 206 penetrates is coaxially formed in the lower surface 214 and in the inner bottom surface 210, and the core cylinder 206 penetrates the hole to define the through hole 26. In the molding die 200, the female mold 202 is filled with a metal powder, and then, the male mold 204 is lowered to enter the female mold 202, thereby compressing the powder. In this manner, the male member 14 can be formed without applying axial load to the core cylinder 206.

Figure 10:
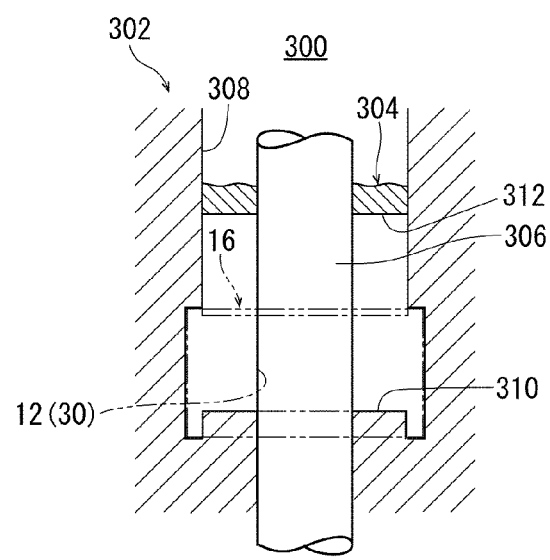
FIG. 10 is a diagram showing an example of a molding die for forming the female member shown in FIG. 4.

FIG. 10 shows an example of a molding die 300 for molding the female member 16 denoted with a chain double-dashed line in the figure. The molding die 300 is constituted of a fixed female mold 302, a male mold 304 that is vertically movable relative to the female mold 302, and a core cylinder 306 extending linearly in the vertical direction inside the female mold 302. The female mold 302 comprises a bottomed recess portion extending in the vertical direction. The bottomed recess portion has an inner peripheral surface 308 for defining the outer peripheral surface of the female member 16, and an inner bottom surface 310 for defining the axial first side end surface (lower end surface) of the female member 16. The male mold 304 is capable of entering the bottomed recess portion of the female mold 302, and it has a flat lower surface 312 for defining the axial second end surface (upper end surface) of the female member 16. A hole through which the core cylinder 306 penetrates is coaxially formed in the lower surface 312 and in the inner bottom surface 310, and the core cylinder 306 penetrates the holes, and the female engaging portion 12 (internal teeth 30) is defined by the outer peripheral surface of the core cylinder 306. When the molding die 300 is used, the female mold 302 is filled with a metal powder, and then, the male mold 304 is lowered to enter the female mold 302, thereby compressing the powder. In this manner, the female member 16 can be formed without applying axial load to the core cylinder 306.

Therefore, according to the producing method of the present invention, the joint member 4 is produced by forming separately the male member 14 comprising the male engaging portion 10 and the female member 16 comprising the female engaging portion 12 by powder metallurgy, and then, combining the male member 14 and the female member 16 in a relatively non-rotatable manner. Accordingly, the female member 16 can be formed without providing an axially protruding protrusion on the pressing surface of the male mold. According to this method, a high-quality joint member having a male engaging portion and a female engaging portion arranged coaxially at different positions can be produced easily by powder metallurgy, without facing the aforementioned problems that may occur in a case of integrally producing by powder metallurgy a joint member having a male engaging portion and a female engaging portion arranged coaxially at different positions.

Figure 11:
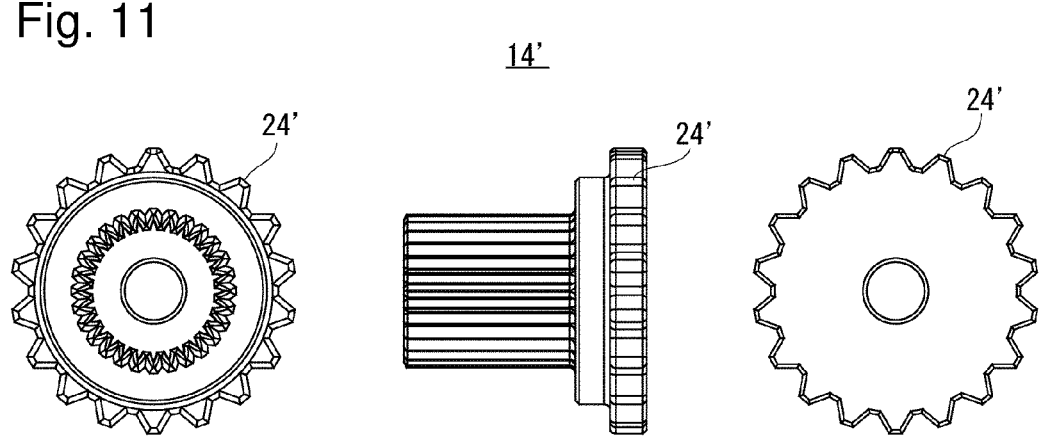
FIG. 11 includes diagrams showing a male member constituting a modification of the joint member constituted by the producing method according to the present invention.
Figure 12:
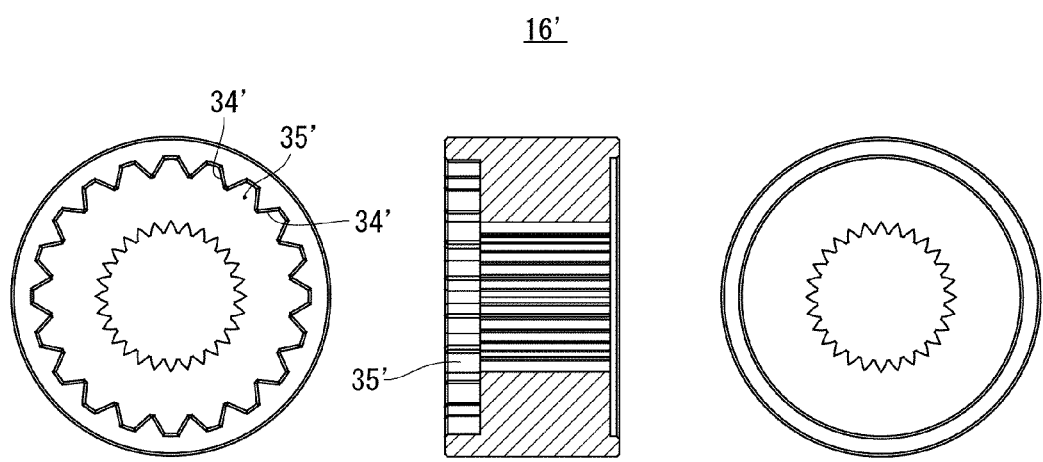
FIG. 12 includes diagrams showing a female member to be combined with the male member shown in FIG. 11.
Figure 13:
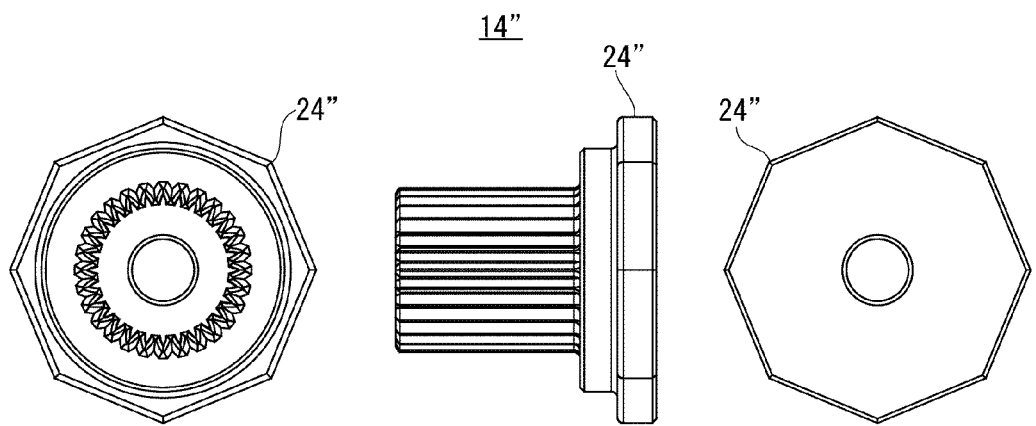
FIG. 13 includes diagrams showing a male member constituting another modification of the joint member produced by the producing method according to the present invention.
Figure 14:
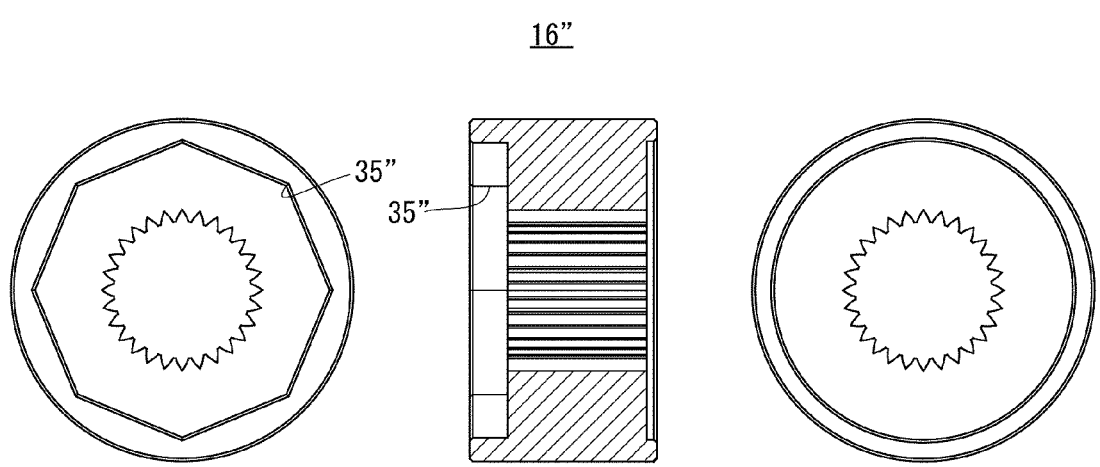
FIG. 14 includes diagrams showing a female member to be combined with the male member shown in FIG. 13.

The method for producing a joint member configured in accordance with the present invention and also an angular position holding apparatus including the joint member produced by the method are described above in detail with reference to the attached drawings. The present invention is not limited to the aforementioned embodiment, but any appropriate modifications can be made in a range without departing from the present invention. For instance in the illustrated embodiment, the male engaging portion is a male serration and the female engaging portion is a female serration. Any male engaging portion and any female engaging portion can be employed as long as each of them is shaped as a gear like a spline. The pitch diameter of the male serration and that of the female serration may not necessarily be the same. Any method or means can be employed to lock the male member and the female member in a relatively non-rotatable manner. In the illustrated embodiment, the locking portions 24 provided to the male member 14 constitute a male square spline, and the lock portions 35 provided to the female member 16 constitute a female square spline. The locking portions 24 and the lock portions 35 may be splines shaped otherwise (for instance, involute splines) or serrations of modified examples shown in FIGS. 11 and 12 (in FIGS. 11 and 12, the same components as those shown in FIGS. 3 and 4 are given the same reference numerals attached with "'"). It is also possible to form the portions to be polygons (a regular octagon in the illustrated embodiment) as in the other modified examples shown in FIGS. 13 and 14 (in FIGS. 13 and 14, the same components as those shown in FIGS. 3 and 4 are given the same reference numerals attached with "''"). In the illustrated embodiment, a coil spring is employed as the braking torque applying means to apply required braking torque to the female member in the angular position holding apparatus. The braking torque applying means may be a leaf spring, a tolerance ring, a wheel spring or the like, and thus, the braking torque applying means may not necessarily be non-rotatable relative to the housing. In addition, the "joint member" in the present invention can be applied not only to the aforementioned angular position holding apparatus but it may be applied also to other apparatuses, or may be used as a single unit, namely as a "joint" that simply connects two members.

EXPLANATIONS OF LETTERS OR NUMERALS

2: Angular position holding apparatus
4: Joint member
6: Braking torque applying means (coil spring)
8: Housing
10: Male engaging portion
12: Female engaging portion
14: Male member
16: Female member
24,24',24": Locking portions
35,35',35": Lock portions

The invention claimed is:

1. A method for producing a joint member having a male engaging portion and a female engaging portion arranged coaxially at different positions in an axial direction, the method comprising:
forming a male member comprising the male engaging portion and a locking portion, and a female member comprising the female engaging portion and a lock portion, separately by powder metallurgy; and
locking the locking portion and the lock portion so as to combine the male member and the female member in a relatively non-rotatable manner, wherein
the male member is provided with a flange portion to which one end of the male engaging portion is fixed,
the female member is provided with a recess portion to accept the flange portion,
the locking portion is a protrusion that protrudes radially outward on an outer peripheral surface of the flange portion, and
the lock portion is a depression with which the protrusion is fitted on an inner peripheral surface of the recess portion.

2. The method for producing a joint member according to claim 1, wherein the male engaging portion and the female engaging portion are shaped like a gear.

3. The method for producing a joint member according to claim 2, wherein a pitch diameter of the male engaging portion is equal to or less than a pitch diameter of the female engaging portion.

4. The method for producing a joint member according to claim 2, wherein the male engaging portion is a male serration and the female engaging portion is a female serration.

5. A method for producing an angular position holding apparatus that comprises: a joint member to mutually connect an input-side device and an output-side device; a braking torque applying means to apply required braking torque to the joint member; a fixed housing; and a shield mounted on the fixed housing, so that the joint member is supported from both sides in an axial direction by an end plate of the fixed housing and the shield, the joint member rotates against the required braking torque when a rotation torque is inputted from the input-side device, and the joint member is held by the required braking torque when no rotation torque is inputted from the input-side device,
wherein the joint member has a male engaging portion and a female engaging portion arranged coaxially at different positions in the axial direction, and the joint member is produced by:
forming a male member comprising the male engaging portion and a locking portion, and a female member that is arranged inside the fixed housing and comprises the female engaging portion and a lock portion, separately by powder metallurgy; and
locking the locking portion and the lock portion so as to combine the male member and the female member in a relatively non-rotatable manner.

6. The method for producing an angular position holding apparatus according to claim 5, wherein
the braking torque applying means is a coil spring that comprises a wound portion comprising a helically wound wire and hook portions formed of the wire extending radially outward from the wound portion,
the wound portion in a free state has an inner diameter smaller than an outer diameter of the female member of the joint member, and the coil spring is mounted on an outer peripheral surface of the female member in a state in which a diameter of the wound portion is enlarged, and
the hook portions fit with a hook groove formed on an inner peripheral surface of the fixed housing, the coil spring being non-rotatable relative to the fixed housing, so that the hook portions are pushed in the hook groove in a direction to loosen the coil spring when the joint member rotates.

* * * * *